Figures 1, 2:
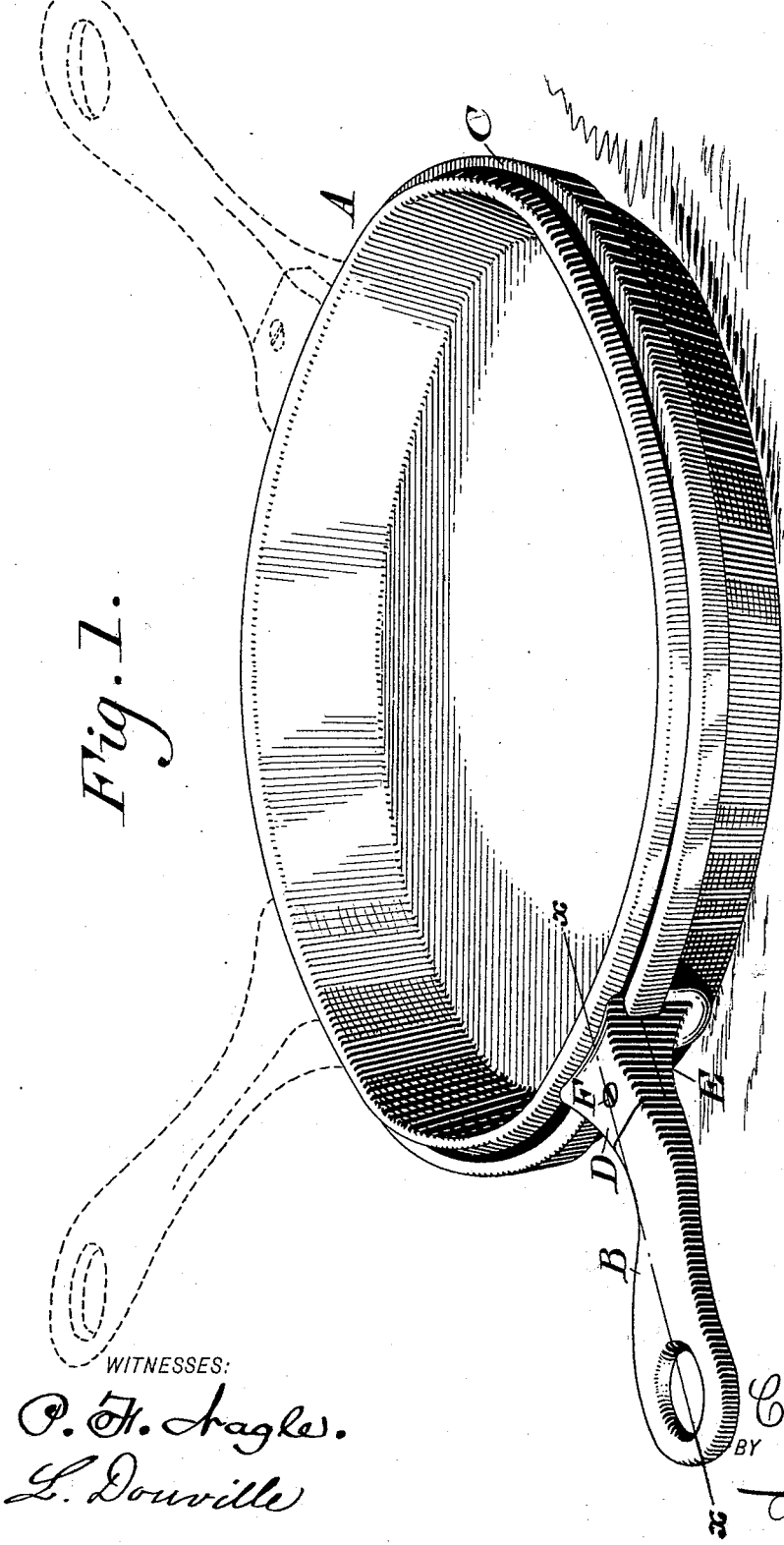

(No Model.)

C. SPAHMER.
FRYING PAN, &c.

No. 498,195.                    Patented May 23, 1893.

WITNESSES:
O. H. Eagle.
L. Douville

INVENTOR
Charles Spahmer
BY John A. Wiedersheim
ATTORNEY.

THE NORRIS PETERS CO., PHOTO-LITHO., WASHINGTON, D. C.

United States Patent Office.

CHARLES SPAHMER, OF PHILADELPHIA, PENNSYLVANIA, ASSIGNOR OF ONE-HALF TO JOSEPH F. THOMAS, OF SAME PLACE.

FRYING-PAN, &c.

SPECIFICATION forming part of Letters Patent No. 498,195, dated May 23, 1893.

Application filed January 5, 1893. Serial No. 457,326. (No model.)

*To all whom it may concern:*

Be it known that I, CHARLES SPAHMER, a citizen of the United States, residing in the city and county of Philadelphia, State of Pennsylvania, have invented a new and useful Improvement in Frying-Pans and other Cooking Utensils, which improvement is fully set forth in the following specification and accompanying drawings.

My invention consists in providing a frying pan or other culinary utensil with a handle that may be shifted around the same, so that it may be placed in desirable, convenient and comparatively cool positions, and may also be removed from contact with a stove pipe, tea kettle or other object on a stove or range, while permitting of the proper turning and location of the pan, &c.

Figure 1 represents a perspective view of a frying pan embodying my invention. Fig. 2 represents a section of a portion on line x, x, Fig. 1, on an enlarged scale.

Similar letters of reference indicate corresponding parts in the two figures.

Referring to the drawings:—A designates a frying pan or other culinary utensil, and B the handle thereof. On the periphery of said pan is a circumferential rib or flange C, on which is freely fitted the handle, the latter thus being permitted to ride around the pan on said flange. By this provision, the handle may be shifted, while the pan may be located, turned, and otherwise manipulated, the shifting of the handle being accomplished without disturbing the pan, and adapting the same to be placed in convenient, and comparatively cool positions, removed from contact with the stove pipe, a kettle or other object on the stove or range, &c. The handle is divided at the place of engagement with the flange, and the sections D and E thus formed are grooved to receive and freely embrace the flange, so that the shifting of the handle thereon is permitted. A screw F or other fastening is employed to connect the sections, it being evident that the latter are primarily separated, in order to fit the handle on the flange, after which the fastening is applied, and thus the handle is held in position, the pan being adapted to be lifted and carried by the handle, as usual with the advantages of shiftability of the latter, as has been stated.

Having thus described my invention, what I claim as new, and desire to secure by Letters Patent, is—

1. A culinary vessel provided with a detachable sectional handle adapted to be located at any portion of the periphery thereof, substantially as described.

2. A culinary vessel having a circumferential flange thereon, and a shiftable handle fitted on said flange, substantially as described.

3. A culinary vessel having a shiftable handle fitted on a flange on the periphery thereof, and formed in sections which are freely connected with said periphery, substantially as described.

CHARLES SPAHMER.

Witnesses:
 JOHN A. WIEDERSHEIM,
 A. P. JENNINGS.